US006682271B2

(12) United States Patent
Kichin

(10) Patent No.: US 6,682,271 B2
(45) Date of Patent: Jan. 27, 2004

(54) MILLING TOOL AND INSERT, PARTICULARLY THREAD MILLING CUTTER

(75) Inventor: Michael Kichin, Haifa (IL)

(73) Assignee: Vargus Ltd. (IL)

( * ) Notice: Subject to any disclaimer, the term of this patent is extended or adjusted under 35 U.S.C. 154(b) by 23 days.

(21) Appl. No.: 09/729,054

(22) Filed: Dec. 4, 2000

(65) Prior Publication Data

US 2001/0018010 A1 Aug. 30, 2001

(30) Foreign Application Priority Data

Dec. 4, 1999 (DE) .......................... 199 58 636

(51) Int. Cl.⁷ .............................. B23C 5/20; B26D 1/12
(52) U.S. Cl. .......................................... 407/24; 407/25
(58) Field of Search ............................... 407/24, 25, 26, 407/27, 28, 29, 35, 43, 53, 56, 61, 62

(56) References Cited

U.S. PATENT DOCUMENTS

| 4,182,587 A | * | 1/1980 | Striegl ........................ 407/113 |
| 4,205,932 A | * | 6/1980 | Tennutti ........................ 407/25 |
| 4,215,955 A | | 8/1980 | Lillie |
| 4,335,983 A | * | 6/1982 | Wermeister et al. .......... 407/41 |
| 4,812,087 A | * | 3/1989 | Stashko ....................... 407/113 |
| 4,913,604 A | * | 4/1990 | Zaengerle ..................... 407/113 |
| 5,112,162 A | * | 5/1992 | Hartford et al. ............... 407/49 |
| 5,325,748 A | * | 7/1994 | Ehrenberg .................... 407/114 |
| 5,542,792 A | * | 8/1996 | Krueger et al. ................ 407/35 |
| 5,542,793 A | * | 8/1996 | Deiss et al. .................. 407/104 |
| 5,791,832 A | * | 8/1998 | Yamayose .................... 407/113 |
| 5,873,681 A | | 2/1999 | Pfob et al. |
| 5,873,684 A | * | 2/1999 | Flolo ........................... 407/11 |
| 5,904,449 A | * | 5/1999 | Satran et al. ................. 407/113 |
| 5,921,719 A | * | 7/1999 | Laflamme ..................... 407/40 |
| 5,944,456 A | * | 8/1999 | Shirley et al. ................. 407/42 |
| 6,224,299 B1 | * | 5/2001 | Frecska et al. ................ 407/41 |

FOREIGN PATENT DOCUMENTS

| DE | 38 07 900 A1 | 9/1989 |
| EP | 0 308 874 A2 | 3/1989 |
| EP | 0 885 678 A2 | 12/1998 |
| WO | WO-00/02692 A1 | 1/2000 |

* cited by examiner

Primary Examiner—A. L. Wellington
Assistant Examiner—Brian D. Walsh
(74) Attorney, Agent, or Firm—Akerman Senterfitt

(57) ABSTRACT

The invention relates to a milling tool. The milling tool has bearing and orientation surfaces for a substantially tangential reception of milling inserts. The receptacles of the milling tool can be arranged in adjacent manner axially symmetrically to the rotational milling axis of the milling tool. The milling insert can be eccentrically braced in the milling tool receptacle.

26 Claims, 8 Drawing Sheets

MILLING TOOL AND INSERT, PARTICULARLY THREAD MILLING CUTTER

BACKGROUND OF THE INVENTION

1. Field of the Invention

The invention relates to a milling tool, particularly a thread milling cutter.

2. Description of the Prior Art

Milling tools are generally known and are used in the most varied constructional forms for carrying out different milling tasks. Milling methods are subdivided on the basis of the surface produced, the tool shape and the kinematics, inter alia into plain, circular, profile and form milling, as well as hobbing. Profile milling e.g. includes the milling of threads or grooves.

In thread milling the tool rotates about its own axis and simultaneously moves in three axes, namely the space axes x, y and z. The most important setting parameters are the milling cutter speed and the feed rate of the milling cutter in the xy-plane.

In the case of milling tools it is known to place milling inserts radially with respect to the rotation axis. The milling inserts can be screwed or soldered to the tool.

DE 36 32 296 A1 discloses a thread milling tool for milling internal or external threads on workpieces. The thread milling tool has a milling cutter shank, to which is fixed a trapezoidal turning milling plate, which is provided with a toothed thread milling edge on both plate sides. The thread milling edges are formed by the two plate sides and an edge face at an angle thereto.

SUMMARY OF THE INVENTION

The problem of the invention is to provide a milling tool of the aforementioned type, which can be used in stable, universal form and which in particular permits a high cutting capacity, even in the case of a small tool diameter.

According to the invention the problem is solved by the features of claim 1. The bearing and orientation surfaces of the milling tool are consequently constructed for a substantially tangential reception of milling inserts, e.g. turning cutting bits or indexable inserts. A comparison with a conventional milling tool, where the milling inserts are positioned radially on the circumference of the cutter shank and are e.g. fixed by screws or wedges with the milling tool according to the invention shows that for the same diameter of the two shanks on the milling tool according to the invention it is possible to provide more milling inserts on the milling tool according to the invention than with a conventional milling tool. Thus, the milling tool according to the invention can be equipped with a plurality of milling inserts. This is achieved by the tangential reception of the milling inserts. The milling capacity, i.e. the metal removal rate per time unit or revolution of such a milling tool is higher than conventional milling tools, so that the tool lifes also longer.

In the case of conventional milling tools the receptacles for the milling inserts are often constructed in such a way that on the circumference of the milling tool there are deep reception openings oriented radially to the milling cutter rotation axis, which reduces the tool stability. In the case of the milling tool according to the invention, this situation does not arise. Therefore the milling tool according to the invention is more stable and compact than conventional milling tools, particularly when compared with a conventional tool with in each case the same number of fixed milling inserts.

In particularly preferred manner in the case of the milling tool according to the invention, the bearing and orientation surfaces of the milling insert and milling tool engage with one another and are pressed together under pretension. The force acting on the milling insert when machining a workpiece consequently does not act directly on the fastening elements of the milling inserts and is instead transferred to the bearing and orientation surfaces, where transmission occurs by frictional grip. In conventional milling tools this force acts on the fastening elements, e.g. screws or soldered joints. There is a high risk of loosening or breaks on the fastening elements, e.g. the shearing off of screws, etc. In the milling tool according to the invention this risk is much lower as a result of the advantageous force transfer to the bearing and orientation surfaces.

In conventional milling inserts, which are e.g. radially fixed by screws, the accuracy to size when machining workpieces is very highly dependent on the fixing of the inserts in the milling tool. A change to the fixing position has a direct effect on the depth of cut of the cutting edge of the milling insert. Therefore the groove, thread, etc. produced on the workpiece no longer has a uniform depth. With the milling tool according to the invention a change in the fixing position of the milling insert in the milling tool acts approximately tangentially and there is a reduced change to the cutting-in depth of the milling insert.

It is possible to provide several receptacles on one circumferential surface of the milling tool. The circumferential surface is formed by equally large portions, preferably by the receptacles themselves. The receptacles can be arranged in one or more planes of the milling tool, preferably in closely juxtaposed form to one another. Thus, two or more receptacles can be successively positioned coaxially to the rotational milling axis. The successive receptacles can be aligned or displaced with respect to one another. Although the receptacles could be arranged irregularly around the rotational milling axis, they are preferably positioned regularly and in particular axially symmetrically to the rotational milling axis, so that the milling tool is completely symmetrical. Therefore the milling tool rotates and the rotational movement of the milling tool is not impaired by imbalances due to irregularly positioned milling inserts. The receptacles can be closely juxtaposed on the circumferential surface and are preferably adjacent to one another. This utilizes the entire circumferential surface of the milling tool as a receptacle. The receptacles are consequently individual portions of the circumferential surface of the milling tool. The milling tool can have a reception area with a polygonal cross-section. The cross-section can e.g. be a square or an equilateral hexagon or octagon. The portions constructed as receptacles could consequently all be the same size.

The bearing and orientation surfaces of the milling tool receptacle can be positioned in an inclined manner and in particular at an angle to one another. It is possible for one bearing and orientation surface of a receptacle to be more strongly inclined, e.g. forming a larger angle with the horizontal, than its facing bearing and orientation surface. The receptacle has bearing and orientation surfaces, as well as support surfaces, which are constructed in different planes. The support surfaces, as well as the bearing and orientation surfaces preferably form a right angle. The bearing and orientation surfaces are in particular flanks on the receptacle. The receptacle can be constructed in truncated trapezoidal manner, but can also have other geometries. The receptacles are preferably recesses in the milling cutter shank. However, they can also be separate parts fixable to the said shank.

The receptacles of the milling tool preferably have holes with the aid of which the milling insert can be fixed to the milling tool. It is possible to use two holes for fixing a tool insert. The holes are located on a common plane oriented coaxially to the rotational milling axis. In the case of several milling inserts on the milling tool, the holes can be axially symmetrical to the rotational milling axis. The center axes of the holes can be perpendicular to the rotational milling axis.

The milling insert is eccentrically braced in order to bring about a positive bearing of the bearing and orientation surfaces of the milling insert on the bearing and orientation surfaces of the milling tool. As a result the bearing and orientation surfaces in each case automatically engage with one another on tightly screwing down the insert. The eccentric bracing can be brought about by a spot facing of the holding section of the milling insert and/or a sloping head of a joining element, particularly a screw. The holes in the tool are at a somewhat shorter distance from the bearing and orientation surfaces of the tool than in the case of the corresponding elements of the insert. Thus, on tightening, the screws push the insert into its receptacle.

The milling cutter shank can have two areas, namely a reception area and a holding area. The receptacles for the milling inserts are preferably located on the reception area. The holding area can be used for introducing the milling tool into a milling machine. It is also possible to use shankless milling tools, e.g. hobbing cutters. They can be fixed to the milling machine by means of a hole, e.g. by means of a central hole passing through the entire milling tool body.

In a particularly preferred arrangement, the milling insert has a holding section and a cutting section. The holding section can be plate-like. The optionally profiled cutting edges of the milling insert are located on the cutting section. The cutting edge can extend over only a portion or over the entire width of the cutting section. Preferably the holding section and cutting section are arranged at an angle to one another. The angle is obtuse and is in the range 100° to 150°. The bearing and orientation surfaces of the milling insert are preferably constructed on the holding section. On equipping the milling tool with the milling inserts only the holding section engages on the bearing surface of the receptacle and the cutting section is free from holding functions.

The milling insert, particularly the cutting section of the milling insert, can have a tool face, which can be straight or rounded. The tool face can be constructed in chip guidance face form. In particular the preferably crescent-shaped tool face located in the milling tool rotation direction can be used for chip removal. The chips can be moved past the adjacent, preferably aligned, trailing edge of the closest milling insert.

It is possible to construct the milling insert with chamfered edges directed towards a workpiece to be machined. This is in particular used with milling inserts having large dimensions in order to prevent any contact between said edges and the workpiece.

The milling tool, as well as the milling insert are preferably made from metal, e.g. carbide or high speed steel, but can also be made from other materials usable for milling purposes.

These and further features can be gathered from the claims, description and drawings and the individual features, both singly and in the form of subcombinations, can be implemented in an embodiment of the invention and in other fields and can represent advantageous, independently protectable constructions, for which protection is here claimed.

The subdivision of the application into individual sections and the subheadings in no way limit the general validity of the statements made thereunder.

BRIEF DESCRIPTION OF THE DRAWINGS

Several embodiments of the invention are described hereinafter relative to the drawings, which show.

DETAILED DESCRIPTION OF THE PRESENT INVENTION

Figure 1:
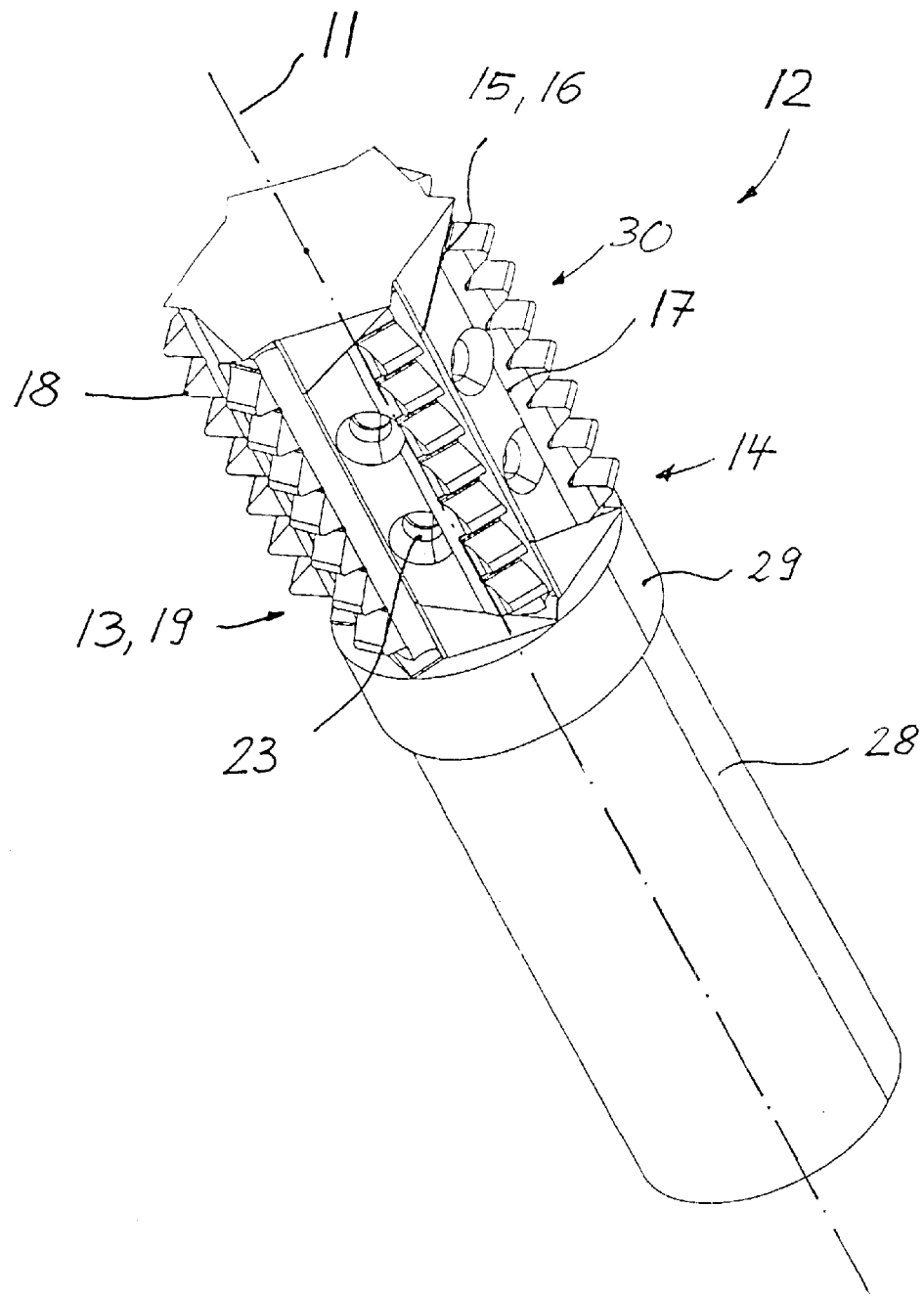
FIG. 1 A three-dimensional view of a first embodiment of a milling tool equipped with milling inserts.
Figure 2:
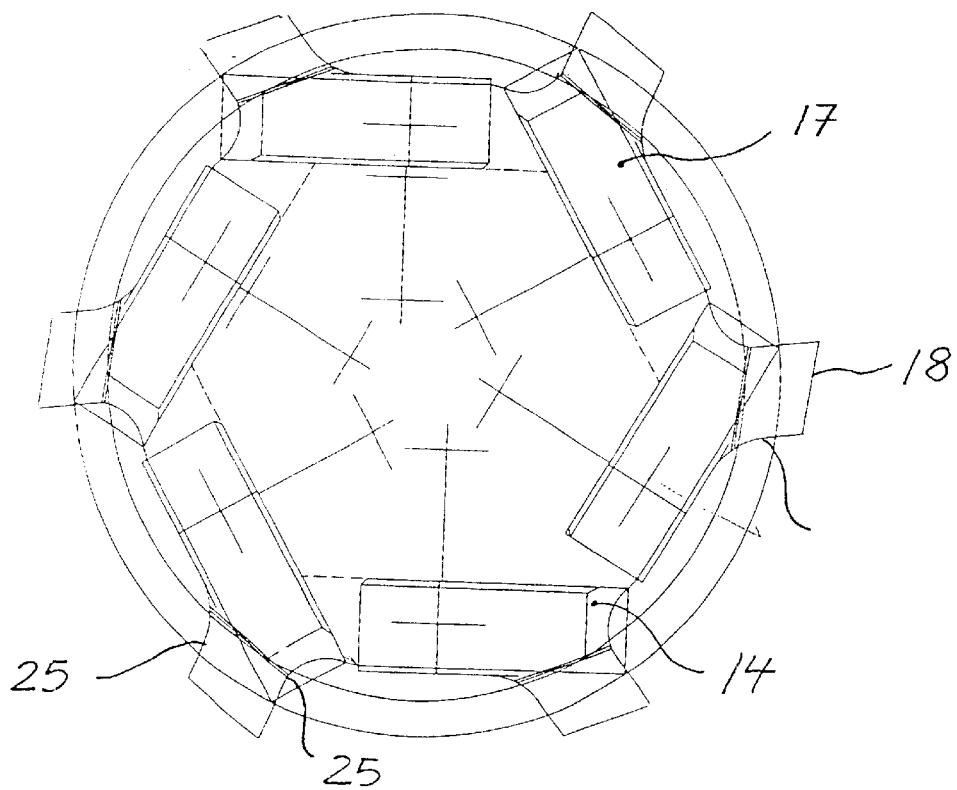
FIG. 2 A sectional plan view of the first embodiment of the equipped milling tool.
Figure 3:
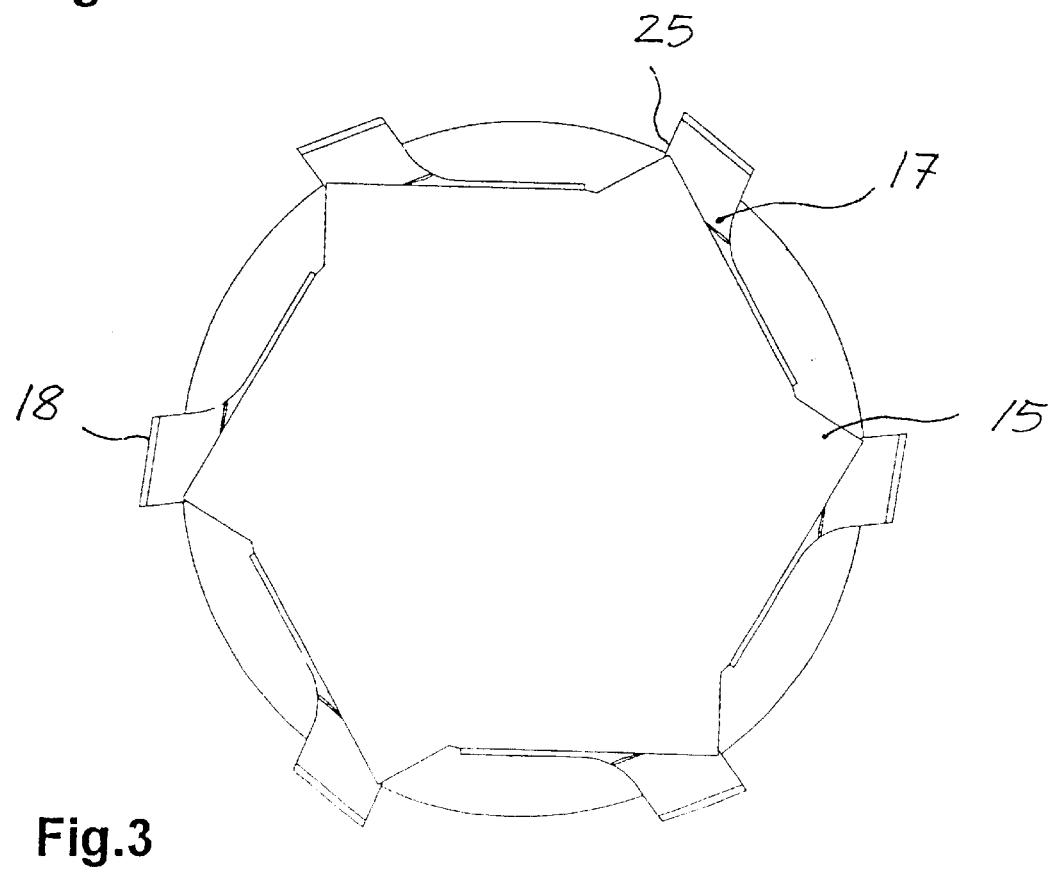
FIG. 3 A plan view of the first embodiment of the milling tool.
Figure 11:
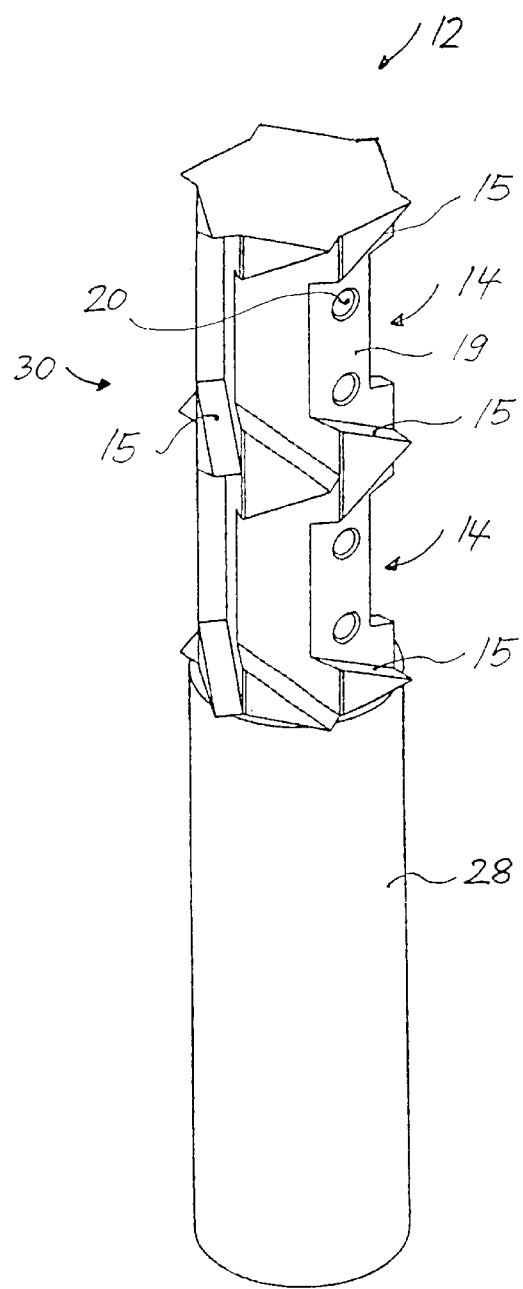
FIG. 11 A three-dimensional view of a second embodiment of the milling tool in the unequipped state.
Figure 12:
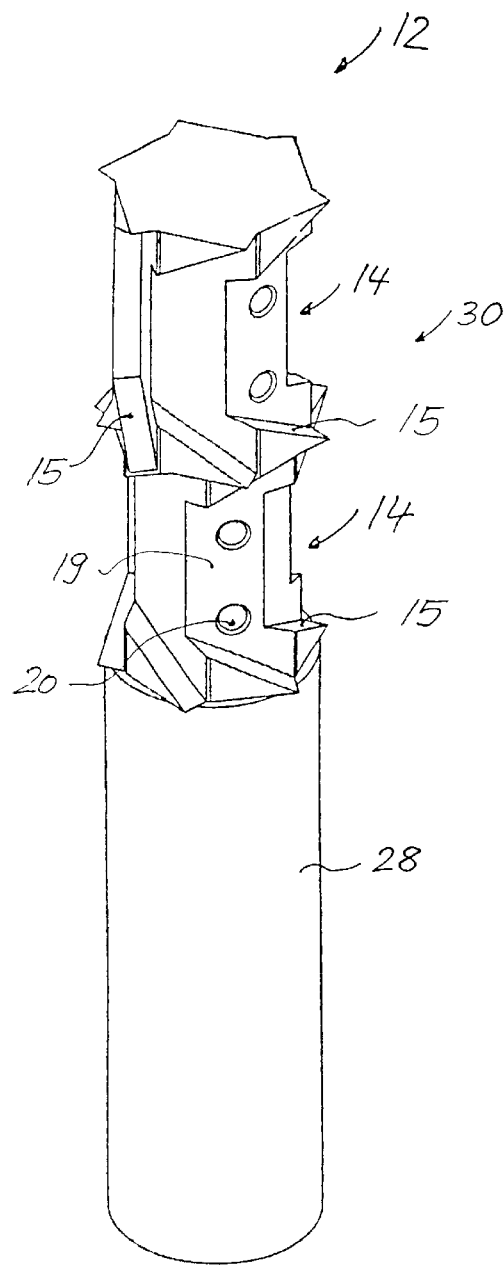
FIG. 12 A three-dimensional view of a third embodiment of the milling tool in the unequipped state.
Figure 13:
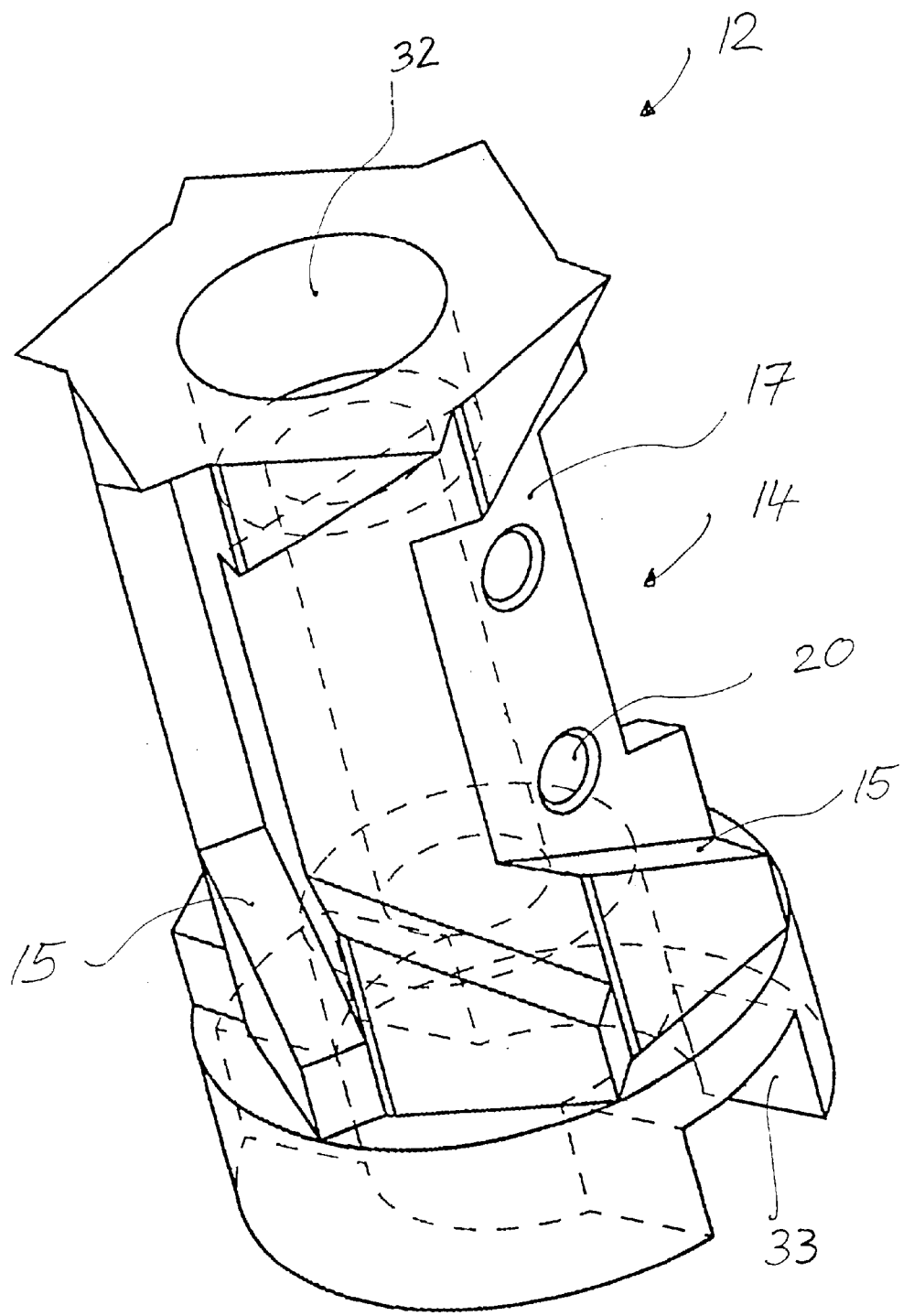
FIG. 13 A three-dimensional view of a fourth embodiment of the milling tool in the unequipped state.

The thread milling tool according to FIG. 1, as well as its further embodiments according to FIGS. 11, 12 and 13 are intended for use in a milling machine or the like.

FIG. 1 shows a first embodiment of a milling tool equipped with milling inserts 17. The milling tool has a solid body 12 with a cylindrical cross-section. The milling tool is made from steel and the milling insert 17 from carbide. Such a milling tool embodiment e.g. has a diameter of 32 mm and a length of 129 mm. The milling tool has a holding area 28, a stop member 29 and a reception area 30. In operation the milling tool rotates about its center axis, i.e. the rotational milling axis 11.

The holding area 28 has a cylindrical cross-section. It is chamfered at its end facing the reception area 30. In the first milling tool embodiment the reception area extends over somewhat more than half of the entire tool length. The stop member 29 is connected to the holding area 28. The stop member 29 has a larger diameter than the holding area 28 and its length is approximately ⅕ of the length of the holding area 28. The reception area 30 of the milling tool is connected to the stop member 29.

Figure 9:
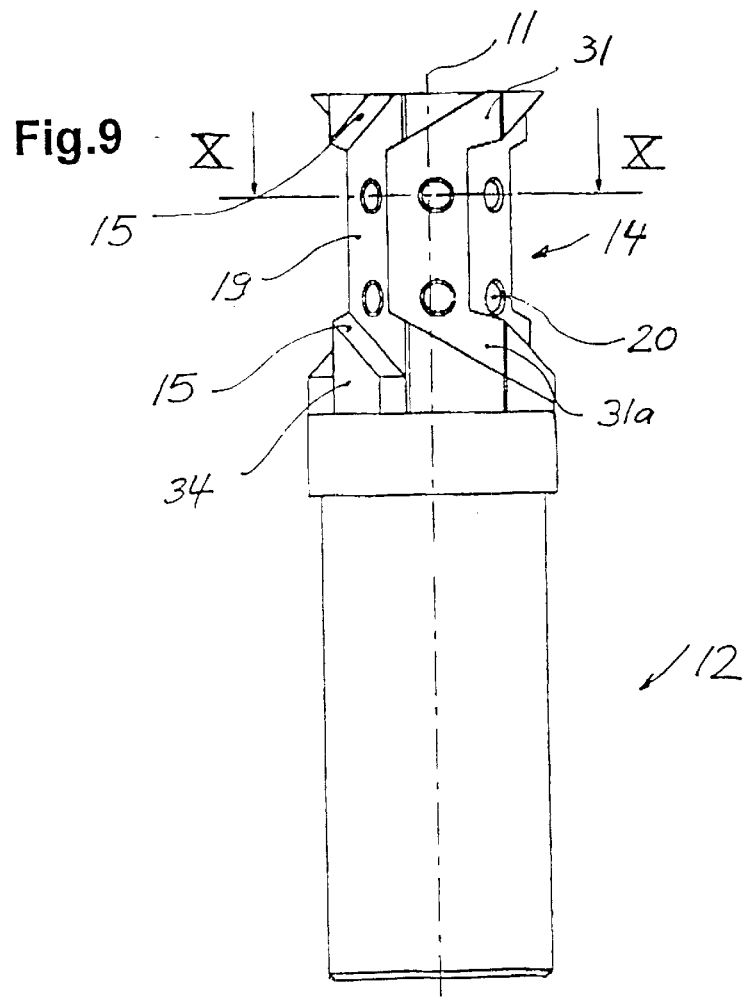
FIG. 9 A side view of the first embodiment of the milling tool in the unequipped state.
Figure 10:
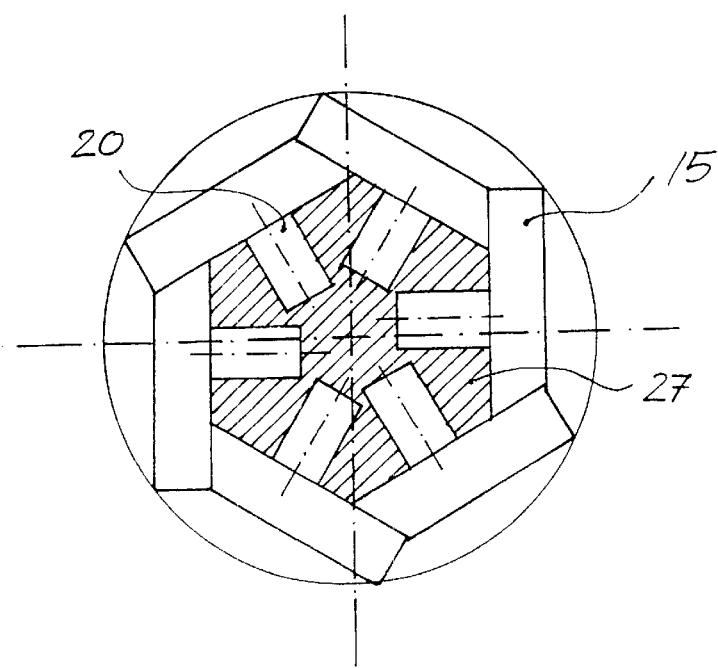
FIG. 10 A cross-section through the first embodiment of the milling tool in the unequipped state of FIG. 9 seen in the direction of arrow 10.

FIG. 9 shows such a reception area 30 of the milling tool in the unequipped state. The reception area 30 has a core section 27 (FIG. 10) with six receptacles 14, as well as bearing and orientation surfaces 15. The core section 27 has the cross-section of a regular hexagon. The six same size lateral faces 13 of the core section 27 form the milling tool receptacles 14 and are positioned in axially symmetrical manner about the rotational milling axis 11. The lateral faces 13 serve as support surfaces 19 for the milling insert 17. In each lateral face, i.e. receptacle 14, there are preferably two holes 20. However, there could also be one hole, or more than two holes 20. The holes 20 pass radially inwards to the center axis of the milling tool, i.e. towards the milling cutter rotational axis 11. One hole 20 is located in the lower area and another hole 20 in the upper area of the receptacle 14. The two holes 20 of a receptacle are located on a line coaxially to the rotational axis 11. The upper and lower holes of the different receptacles 14, in each case in a common plane, are axially symmetrical to the rotational milling axis 11.

The support surface 19 of the receptacle 14 is shaped like a trapezium with two extended side faces 31, 31a. The trapezium sides form an angle between 45° and 90°. The trapezoidal support surface 19 undergoes edging on its sides of in each case one bearing and orientation surface 15, so that the bearing and orientation surfaces 15 form the flanks to the support surface 19. The bearing and orientation surfaces 15 are perpendicular to the support surface 19. They are sloping lateral faces of bearing and orientation sections 34 projecting from the milling tool core area 27. Lateral faces facing the bearing and orientation surfaces 15 form a radial ring round the milling tool core area 27 on the end face of the milling tool.

Figure 4:
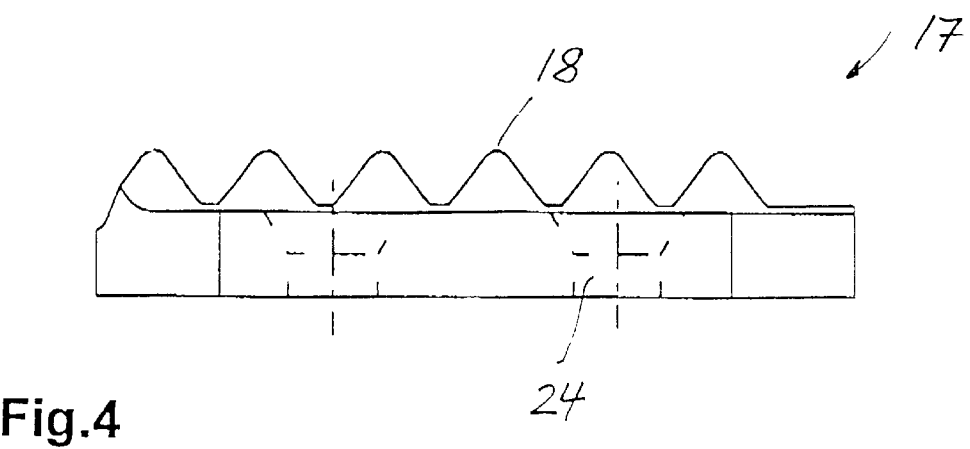
FIG. 4 A side view of the milling insert.
Figure 5:
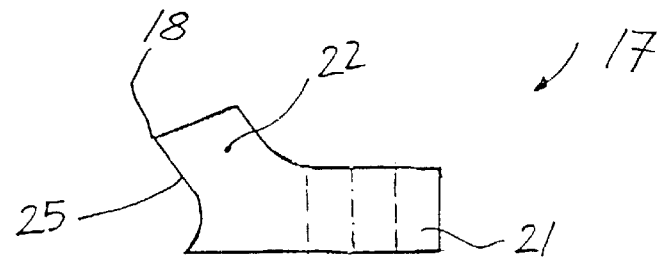
FIG. 5 A sectional view through the milling insert.
Figure 6:
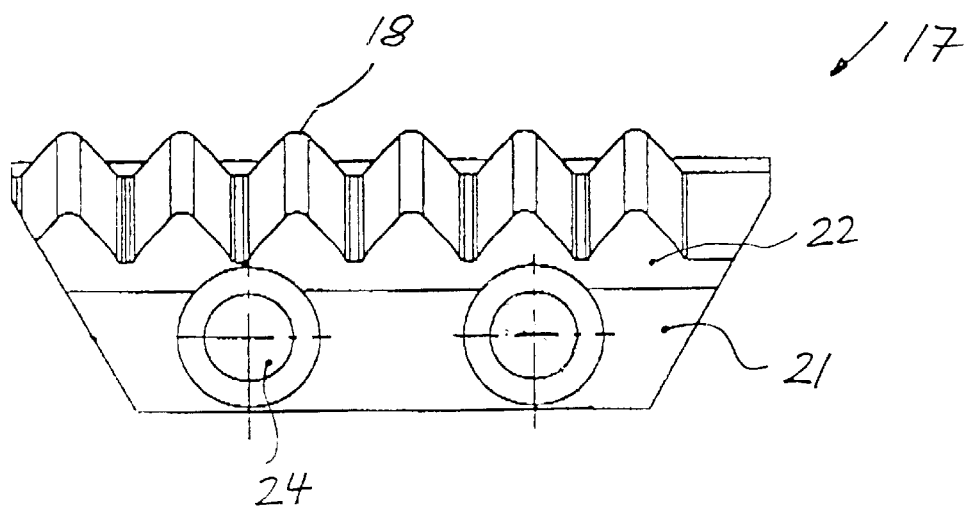
FIG. 6 A plan view of the milling insert.

FIGS. 4 to 6 show the milling insert 173 which has a holding section 21 and a cutting section 22. The holding section 21 is shaped as a trapezoidal plate. The lateral faces of the plate farm the bearing and orientation surfaces 16 of the milling insert 17. The holding section 21 has two boles 24 for fixing and for eccentrically tensioning 23 the milling insert 17 on the milling tool. On the top surface of the holding section 21 the holes 24 are spot faced in funnel-shaped manner for countersinking a countersunk screw head. This countersinking can be uniformly shaped. e.g. by different inclinations of the funnel surface.

The cutting section 22 is positioned at an obtuse angle to the holding section 21 and consequently forms with the latter a hockey stick-shaped cross-section. The angle between the two is between 100° and 150°. The cutting section 22 has a tooth system, which is constructed over the entire length of the cutting section 22. The front of the cutting section 22 is constructed as a tool face 25. The tool face 25 is hollow rounded and is crescent-shaped. The tool face 25 and the teeth form the cutting edge 18. The tool face 25 also serves as a chip guidance surface.

Figure 7:
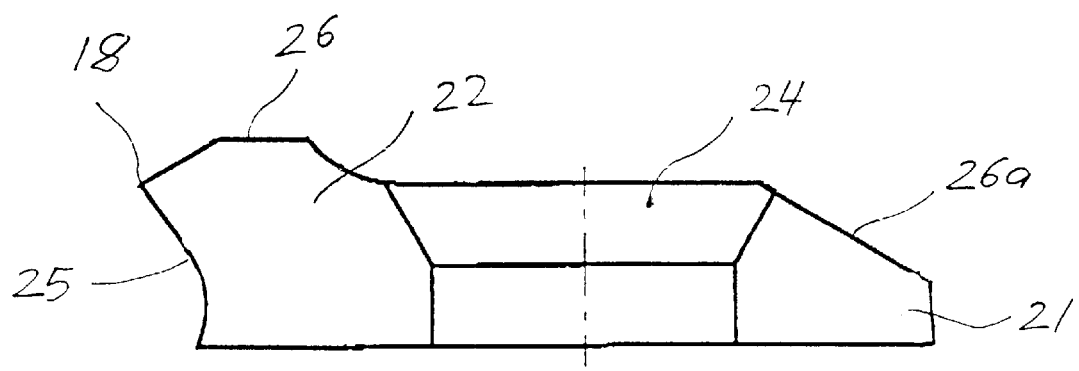
FIG. 7 A section through another embodiment of the milling insert.
Figure 8:
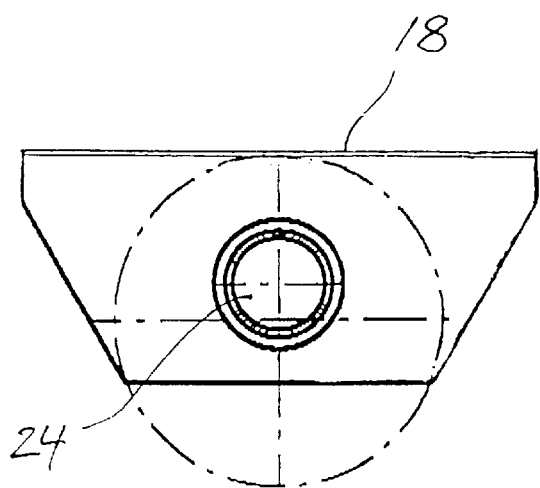
FIG. 8 A reduced scale plan view of the further embodiment of the milling insert (before cutting profiling).

FIGS. 7 and 8 show a further embodiment of the milling insert 17. This milling insert 17 also has a holding section 21 and a cutting section 22, which is here not yet provided with the thread profile for thread milling. A funnel-shaped hole 24 is provided on the plate-like holding section 21. The edge 26a of the holding section 21, which faces the cutting section 22, is bevelled. The cutting section 22 has an edge face 26 and a tool face 25. The edge face and tool face form the cutting edge 18. The edge of the edge face facing the cutting edge 18 is bevelled. This construction is particularly suitable for small tool diameters and optionally when equipped with less than six inserts. As a result of the buckled end of the cutting section 22 and the bevel 26a, clearly visible in FIG. 7, it is possible to make the cutting edge travel circle smaller.

FIG. 11 shows a second embodiment of the milling tool. The milling tool also has a holding area 28 and a reception area 30. The reception area 30 has twelve receptacles 14, six of which are located in one plane in axially symmetrical manner to the rotational milling axis 11. In each case two receptacles 14 are in successive alignment coaxially to the rotational milling axis 11.

FIG. 12 shows a third embodiment of the milling tool. Like the second embodiment according to FIG. 11, it has twelve receptacles 14, whereof in each case six are located in one plane. Unlike in the case of FIG. 11, there are in each case two successively displaced receptacles 14 coaxial to the rotational milling axis 11.

FIG. 13 shows a fourth embodiment of the milling tool in the form of a shankless hobbing cutter. The hobbing cutter has a through center hole 32 for the introduction into a mandrel-like mounting support (not shown). On the underside of the hobbing cutter is formed a through radial groove 33, which protects the hobbing cutter against twisting on the mandrel-like mounting support.

Figure 14:
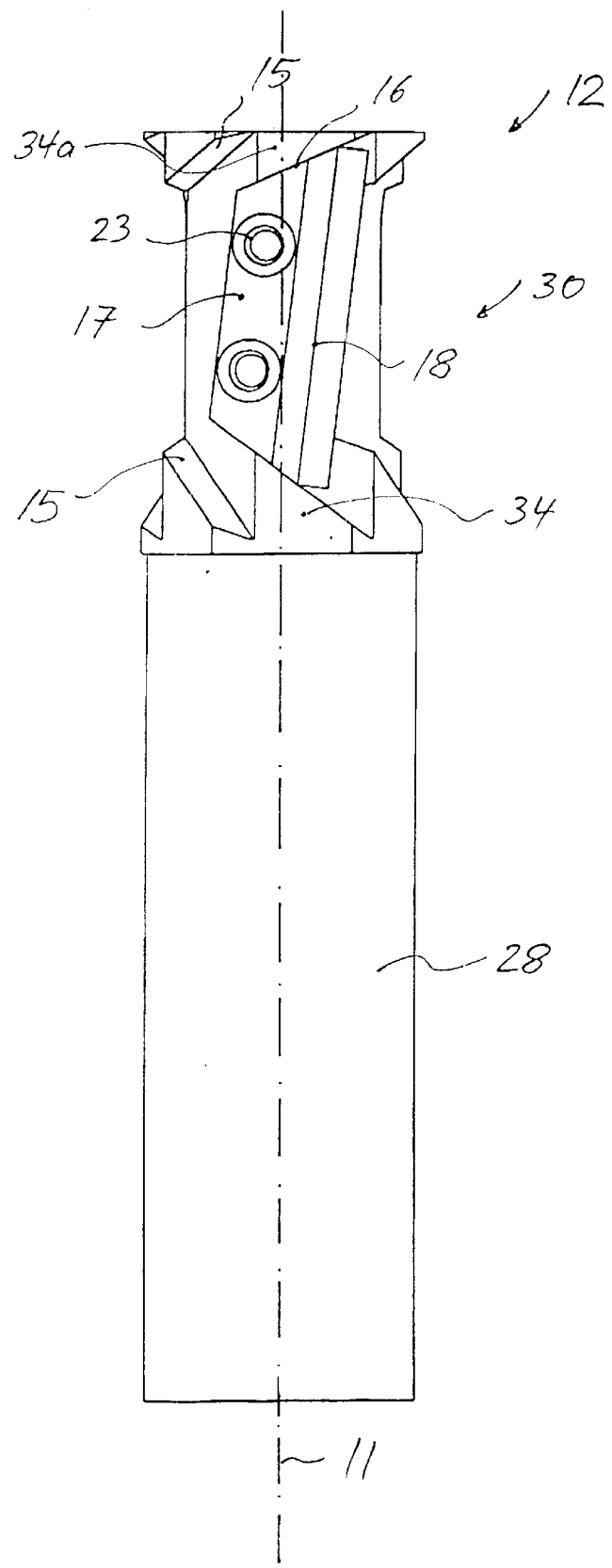
FIG. 14 A side view of a fifth embodiment of the milling tool in a partly equipped state.

FIG. 14 shows a fifth embodiment of the milling tool. As in the first embodiment according to FIG. 9, the milling tool has a holding area 28 and a reception area 30 with six receptacles 14. The receptacles 14 have in each case two bearing and orientation sections 34, 34a, whose inclined lateral faces form bearing and orientation surfaces 15.

The two bearing and orientation surfaces 15 of a receptacle 14 are inclined to a differing extent with respect to the horizontal. Thus, the bearing and orientation surface 15 is steeper on the lower bearing and orientation section 34 directed towards the holding area 28 than the bearing and orientation surface 15 on the upper bearing and orientation section 34a directed towards the end of the milling tool. Thus, the milling inserts 17 are clamped in inclined form, so that their cutting edges 18 are no longer parallel to the rotational milling axis 11 and are instead slightly inclined thereto.

DESCRIPTION OF OPERATION

1. Producing the insert and equipping the milling tool

The milling insert 17 is made from carbide in a sintering process and can then be optionally cut to length from a profiled bar. It is then ground to size and the cutting profile is ground in the cutting section 22.

For equipping the milling tool with milling inserts 17 firstly the plate underside of the holding section 21 of a milling insert 17 is placed on the support surface 19 of a milling tool receptacle 14. The center axes of the holes 20, 24 of the holding section 21 of the milling insert 17 and those of the receptacle are in displaced, superimposed form. Then two screws with optionally bevelled screw heads are introduced into the holes 20, 24. The bearing and orientation surfaces 16 of the milling insert 17 on the holding section 21 thereof, are pressed onto the bearing and orientation surfaces 15 of the receptacle 14 through the displaced holes 20, 24, during the tightening of the screws. Thus, the milling insert 17 is braced positively in the milling tool receptacle 14 at the bearing and orientation surfaces 15 and non-positively on the support surface 19 thereof.

The milling tool equipped with the milling insert 17 is introduced into a mounting support of the milling machine. The milling tool is rotated and guided up to a workpiece in the working position. The cutting edges 18 of the milling insert 17 then mill the desired contour, e.g. a thread or a groove in the workpiece. The chips removed through the cutting edge 18 are directed past by the tool face 25 of the milling insert 17 constructed as a chip guidance surface. A cutting force acts tangentially on the particular cutting edge 18 in the machining position. This force is reduced on the bearing and orientation surfaces 15 of the milling insert 17 and the milling tool receptacle 14.

The six inserts in the illustrated first embodiment of the milling tool are consequently very closely juxtaposed with their plate-like holding areas 21 entirely or approximately tangentially oriented around the milling cutter head, which permits optimum equipment. The cutting edges projecting under an obtuse angle from the holding areas 21 transfer the cutting forces acting thereon very directly to the tool body and only a partial force component acts on the fastening screws. Chips are removed by means of a rounded chip guidance surface in the chip space formed between the holding area 21 of the leading insert 17 and the milling cutter travel circle.

What is claimed is:

1. A milling insert comprising:
   a generally flat holding section for connecting the milling insert to a receptacle of a milling cutter shank, the holding section having a trapezoidal inner base face forming a bearing surface for bearing against the milling cutting shank, an outer top face, a rear face, and lateral faces extending on both sides of the holding sectional, said lateral faces forming sides of the holding section and defining orientation surfaces, the sides of the holding section diverging from the rear face to a front portion of the holding section;
   a cutting section for cutting a workpiece, said cutting section forming said front portion of the holding section, and projecting outwardly from the holding section at an obtuse angle thereto, the cutting section having an outwardly pointing end face, a rear face, and a front face including a planar portion and a rounded tool face portion, wherein the rounded tool face portion of the front face of the cutting section is constructed as a chip guidance surface for guiding chips away from the cutting section of the milling insert, and wherein a cutting edge is formed at the intersection of the end face and the planar portion of the front face;
   at least one hole through the holding section for receiving holding means for pressing the holding section to a bearing surface of the milling cutter shank;
   wherein the holding section and the cutting section of the milling insert are arranged such that said rear face of the cutting section and the outer top face of the holding section are at an obtuse angle to one another.

2. The insert according to claim 1, wherein the angle between the holding and cutting section is between 100° and 150°.

3. The insert according to claim 1, wherein the insert is trapezoidal in plan view.

4. The insert according to claim 3, wherein the insert comprises bearing and orientation surfaces for interaction with bearing and orientation surfaces of the receptacle of the milling cutter shank, and wherein said bearing and orientation surfaces of the insert are arranged on the angled sides of the trapezoidal holding section.

5. The insert according to claim 1, wherein the milling insert comprises at least one hole for fixing the milling insert on the milling cutter shank, and wherein the holding section of the milling insert comprises an inclined surface for eccentric bracing with the milling cutter shank.

6. The insert according to claim 5, wherein the inclined surface of the holding section of the milling insert is selected from the group consisting of a spotfacing of the holding section and a countersunk head of a joining element.

7. The insert according to claim 1, wherein said chip guidance surface is coupled to the holding section of an adjacent insert when the insert is coupled to the milling cutter shank.

8. The insert according to claim 7, wherein, when the insert is coupled to the milling cutter shank, the chip guidance surface is coupled contiguously with the holding section of an adjacent insert.

9. A milling tool comprising:
   a milling cutter shank mounted rotatably about a milling rotational milling axis;
   the milling cutter shank comprising a plurality of receptacles formed on a surface of the milling cutter shank for receiving a plurality of milling inserts, the milling cutter shank having a polygonal cross-section in the vicinity of the receptacles;
   wherein each receptacle has bearing and orientation surfaces adapted to cooperate with corresponding bearing and orientation surfaces of the milling inserts for mounting each milling insert in a respective receptacle in a fixed orientation;
   wherein the bearing surfaces of the shank extend in a substantially tangential direction to the circumference of the shank around the rotational milling axis such that bearing surfaces of each adjacent receptacle are contiguous and form said polygonal section of the milling cutter shank;
   wherein the bearing and orientation surfaces of the milling insert are constructed on a holding section of the milling insert at an obtuse angle to a cutting section of the milling insert;
   the cutting section of the milling insert comprising a cutting edge and a tool face constructed as a chip guidance face;
   the milling inserts being fixed to the milling cutter shank by means of holes and screws.

10. The tool according to claim 9, wherein the plurality of receptacles are positioned on said circumferential surface axially symmetrical to the rotational milling axis of the milling cutter shank.

11. The tool according to claim 9, wherein the receptacle has a trapezoidal form.

12. The tool according to claim 11, wherein the bearing and orientation surfaces of each receptacle forms flanks of the trapezoidal receptacle for jamming a milling insert in an essentially tangential position to the rotational milling axis of the milling cutter shank.

13. The tool according to claim 9, wherein the receptacle has at least one hole for fixing the milling insert on the milling cutter shank.

14. The tool according to claim 9, wherein each receptacle has at least one hole for fixing said plurality of milling inserts on the milling cutter shank, said holes arranged in an axially symmetrical manner to the rotational milling axis, and wherein said holes have center axes positioned perpendicular to the rotational milling axis of the milling cutter shank.

15. The tool according to claim 9, wherein the angle between the holding and cutting section of the milling insert is between 100° and 150°.

16. The tool according to claim 9, wherein the milling insert is trapezoidal in plan view.

17. The tool according to claim 9, wherein each milling insert comprises at least one hole for fixing the milling insert on the milling cutter shank, and wherein the holding section of the milling insert comprises an inclined surface for eccentric bracing with the milling cutter shank.

18. The tool according to claim 17, wherein the inclined surface of the holding section of each milling insert is selected from the group consisting of a spotfacing of the holding section and a countersunk head of a joining element.

19. The tool according to claim 9, wherein the cutting section of each milling insert has a rounded tool face constructed as said chip guidance surface for guiding chips away from the cutting section of the milling inset, and wherein said chip guidance surface is coupled to the holding section of an adjacent insert when the insert is coupled to the milling cutter shank.

20. The tool according to claim 9, wherein, when each milling insert is coupled to the milling cutter shank, the chip guidance surface is coupled contiguously with the holding section of an adjacent insert.

21. A milling cutter shank rotatable about a rotational milling axis, comprising:
- a plurality of receptacles formed on a surface of the milling cutter shank, each receptacle provided for receiving a milling insert having a cutting edge;
- each receptacle having bearing and orientation surfaces adapted to cooperate with corresponding bearing and orientation surfaces of the milling insert for mounting the milling insert in the receptacle in a fixed orientation;
- the bearing surfaces extending in a substantially tangential direction to the circumference of the shank around the rotational milling axis;
- at least one hole extending substantially radially in each bearing surface for fixing the milling insert;
- wherein the orientation surfaces extend on both sides of each bearing surface and diverge in a circumferential direction; and
- wherein the bearing surfaces of each adjacent receptacle are contiguous and form a polygonal section of the milling cutter shank.

22. The milling cutter shank according to claim 21, wherein the plurality of receptacles are positioned on said circumferential surface axially symmetrical to the rotational milling axis of the milling cutter shank.

23. The milling cutter shank according to claim 21, wherein the receptacle has a trapezoidal form.

24. The milling cutter shank according to claim 23, wherein the bearing and orientation surfaces of each receptacle forms flanks of the trapezoidal receptacle for jamming a milling insert in an essentially tangential position to the rotational milling axis of the milling cutter shank.

25. The milling cutter shank according to claim 21, wherein each receptacle has at least one hole for fixing the milling inserts on the milling cutter shank.

26. The milling cutter shank according to claim 21, wherein each receptacle has at least one hole for fixing the milling inserts on the milling cutter shank, said holes arranged in an axially symmetrical manner to the rotational milling axis, and wherein said holes have center axes positioned perpendicular to the rotational milling axis of the milling cutter shank.

* * * * *